United States Patent [19]

Hager et al.

[11] Patent Number: 5,317,683

[45] Date of Patent: May 31, 1994

[54] METHOD AND APPARATUS FOR AUTOMATED MEETING AGENDA GENERATION IN A DATA PROCESSING SYSTEM

[75] Inventors: Dean J. Hager, Rochester; Robert P. Resch, Byron; Curtis G. Rose, Rochester, all of Minn.

[73] Assignee: International Business Machines Corporation, Armonk, N.Y.

[21] Appl. No.: 579,473

[22] Filed: Sep. 10, 1990

[51] Int. Cl.⁵ .............................................. G06F 15/62
[52] U.S. Cl. ..................................... 395/145; 395/200; 364/419.2
[58] Field of Search ............... 395/145, 149, 153, 161, 395/200; 364/419, 419.01, 419.2

[56] References Cited

U.S. PATENT DOCUMENTS

| | | | |
|---|---|---|---|
| 4,764,120 | 8/1988 | Griffin et al. | 364/419 |
| 4,817,018 | 3/1989 | Cree et al. | 395/153 |
| 4,996,642 | 2/1991 | Hey | 364/419 |
| 5,040,142 | 8/1991 | Mori et al. | 364/507 |
| 5,125,075 | 6/1992 | Goodale et al. | 395/200 |

OTHER PUBLICATIONS

Sakata, S. "A Distributed Interoffice Mail System", IEEE Computer, vol. 18, No. 10 (Oct. 1985), pp. 106–116.

Kelly, J. N., "Technology that Supports Meetings", Patricia Seybold's Office Computing Report, vol. 11, No. 9 (Sep. 1988) Summary Only.

Marshak, R. T., "Odesta's ODMS: the Process of Document Management", Patricia Seybold's Office Computing Report, vol. 13 No. 8, (Aug. 1990) pp. 1–13.

Marshak, R. T., "Group Scheduling Programs Enhanced", Patricia Seybold's Network Monitor, vol. 4, No. 7, (Jul. 1989) pp. 20–22.

Kelly, J., "Technology That Supports Meetings", Patricia Seybold's Office Computing Report, vol. 11 No. 9 (Sep. 1988) pp. 1 and 3–10.

"Work-group Computing; Access Technology Ships For Comment Document Review Software", EDGE; Work-Group Computing Report, vol. 1 No. 30, (Dec. 17, 1990), p. 27.

Primary Examiner—Heather R. Herndon
Assistant Examiner—N. Kenneth Burraston
Attorney, Agent, or Firm—James H. Barksdale; Andrew J. Dillon

[57] ABSTRACT

The method and apparatus permit the automatic generation of a meeting agenda for a requested meeting concerning a document stored within a data processing system. A document, such as an invention disclosure document, is stored within a data processing system and identified as the subject of a desired meeting. Evaluation comments by a plurality of users within the data processing system regarding the identified document are tabulated and utilized to create a meeting agenda automatically in response to a request for a meeting. Desired meeting parameters including at least: a desired meeting duration; a desired date span; and a list of desired attendees are selected by a meeting requester and copies of the automatically created meeting agenda are automatically transmitted to each desired attendee in conjunction with a notice of the scheduled meeting. Printed copies of the meeting agenda may also be automatically created in response to a scheduled meeting.

11 Claims, 7 Drawing Sheets

```
                                                                    110
┌─────────────────────────────────────────────────────────────┐
│            INVENTION DISCLOSURE EVALUATION REPORT           │
│  DISCLOSURE NO._____  DATE_____  TIME_____  │
│  EVALUATOR: JOE EVALUATOR                                   │
│  CHAIRMAN: SAM CHAIRMAN                                     │
│  I VOTE THAT THIS DISCLOSURE BE RATED AS FOLLOWS:           │
│    SEARCH    PUBLISH    CLOSE    DON'T KNOW    ABSTAIN      │
│    _____    _____    _____    _____    _____      │
│                                                             │
│  I HAVE READ AND UNDERSTAND THE ENTIRE INVENTION DISCLOSURE:│
│        YES _____       NO _____                   │
│  IS FURTHER DISCUSSION NECESSARY:                           │
│        YES _____       NO _____                   │
│  MY LEVEL OF EXPERTISE (1=UNFAMILIAR, 10=EXPERT): _____  │
│  COMMENTS _____│
│  _____│
│  _____│
│  _____│
└─────────────────────────────────────────────────────────────┘
```

Fig. 5

MEETING AGENDA
Page 1

170

172 — Disclosure No. _____  Date _____  Time _____

174 — TABULATION SUMMARY

176 —

| Evaluator | Sch | Pub | Cls | DK | Abs | Disc | Und |
|---|---|---|---|---|---|---|---|
| John Jones | X | | | | | Y | Y |
| Sam Smith | X | | | | | Y | Y |
| Tom Brown | | X | | | | Y | Y |
| Charles Green | | | X | | | N | Y |
| Robert Thompson | | | | X | | Y | N |

178 — John Jones

| Sch | Pub | Cls | DK | Abs | Disc | Und |
|---|---|---|---|---|---|---|
| X | | | | | Y | Y |

DATE VOTED:  20 June 1990   17:17:40

Comments: Looks good valuable and innovative

180 — Sam Smith

| Sch | Pub | Cls | DK | Abs | Disc | Und |
|---|---|---|---|---|---|---|
| X | | | | | Y | Y |

DATE VOTED:  25 June 1990   08:17:53

Comments: This could be significant

182 — Tom Brown

| Sch | Pub | Cls | DK | Abs | Disc | Und |
|---|---|---|---|---|---|---|
| | X | | | | Y | Y |

DATE VOTED:  21 June 1990   15:44:00

Comments: This should be expanded into a technical report

*Fig. 8*

METHOD AND APPARATUS FOR AUTOMATED MEETING AGENDA GENERATION IN A DATA PROCESSING SYSTEM

CROSS REFERENCE TO RELATED APPLICATIONS

This application is related to U.S. patent application Ser. No. 07/579,864, now U.S. Pat. No. 5,247,661, entitled "Method and Apparatus for Automated Document Distribution in a Data Processing System," U.S. patent application Ser. No. 07/579,825, now abandoned in favor of U.S. application Ser. No. 08/107,423, entitled "Method and Apparatus for Automated Procedure Initiation in a Data Processing System," U.S. patent application Ser. No. 07/580,336, now U.S. Pat. No. 5,276,869, entitled "Method and Apparatus for Electronic Corroboration of Documents in a Data Processing System," all filed of even date herewith and assigned to the assignee hereof, and incorporated herein by reference thereto.

BACKGROUND OF THE INVENTION

1. Technical Field

The present invention relates in general to an improved data processing system and in particular to a method and system for generating a meeting agenda for a meeting concerning a document within a data processing system. Still more particularly, the present invention relates to a method and apparatus for automatically generating a meeting agenda from a plurality of evaluations of a document within a data processing system.

2. Description of the Related Art

The modern electronic office is rapidly supplanting and replacing many aspects of the traditional paper office. Modern office systems utilize electronic mail, voice mail, centralized databases and other forms of electronic communication to decrease the amount of so-called "float" encountered in a traditional paper society. By utilizing electronic mail it is possible for a document to be simultaneously transmitted to multiple recipients at various points around the world. Despite the advent of widespread electronic communication, selected activities within the traditional paper office have been difficult to implement in an electronic society.

For example, while it is well known in the electronic office to utilize the advantages of a distributed data processing system to schedule a desired meeting, by entering desired meeting parameters and then electronically searching the calendars of each desired participant for an optimal meeting time, documents which must be generated for that meeting, such as a meeting agenda, must still be manually created in order to inform each attendee in detail about the prospective meeting.

Generally a meeting is accomplished by having a user who requests a meeting enter desired meeting parameters including at least a desired meeting duration; a desired date span; and a desired list of attendees. After comparing these parameters with the information located in each desired attendees' calendar a distributed data processing system is generally capable of scheduling a meeting which complies with the desired meeting parameters, if such a meeting is possible. Thereafter, the scheduler of a meeting must manually create an agenda and supporting documents which are utilized to inform each attendee with regard to the purpose of the meeting.

It should therefore be apparent that a need exists for a method and apparatus whereby a meeting agenda may be automatically generated for a meeting concerning a document which is stored within a data processing system by a reference to that document.

SUMMARY OF THE INVENTION

It is therefore one object of the present invention to provide an improved data processing system.

It is another object of the present invention to provide an improved data processing system which permits automatic generation of a meeting agenda for a meeting concerning a document which is stored within the data processing system.

It is yet another object of the present invention to provide an improved data processing system which permits the automatic generation of a meeting agenda from a plurality of evaluations of an electronic document which is stored within the data processing system.

The method and apparatus of the present invention permit the automatic generation of a meeting agenda for a requested meeting concerning a document which is stored within a data processing system. A document, such as an invention disclosure document, is stored within a data processing system and subsequently identified as the subject of a desired meeting. Evaluation comments by a plurality of users within the data processing system regarding the identified document are tabulated and utilized to create a meeting agenda automatically, in response to a request for a meeting. In one preferred embodiment of the present invention, desired meeting parameters, including at least: a desired meeting duration; a desired date span; and a list of desired attendees are selected by a meeting requester and copies of the automatically created meeting agenda are automatically transmitted to each desired attendee in conjunction with a notice of the scheduled meeting. Printed copies of the meeting agenda may also be automatically created in response to a scheduled meeting.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a pictorial representation of a computer screen which may be utilized to prompt a computer user to evaluate an electronic invention disclosure document in accordance with the method and apparatus of the present invention;

FIG. 8 is a pictorial representation of a computer screen displaying an automatically generated meeting agenda which is generated in accordance with the method and apparatus of the present invention.

DETAILED DESCRIPTION OF PREFERRED EMBODIMENT

Figure 1:
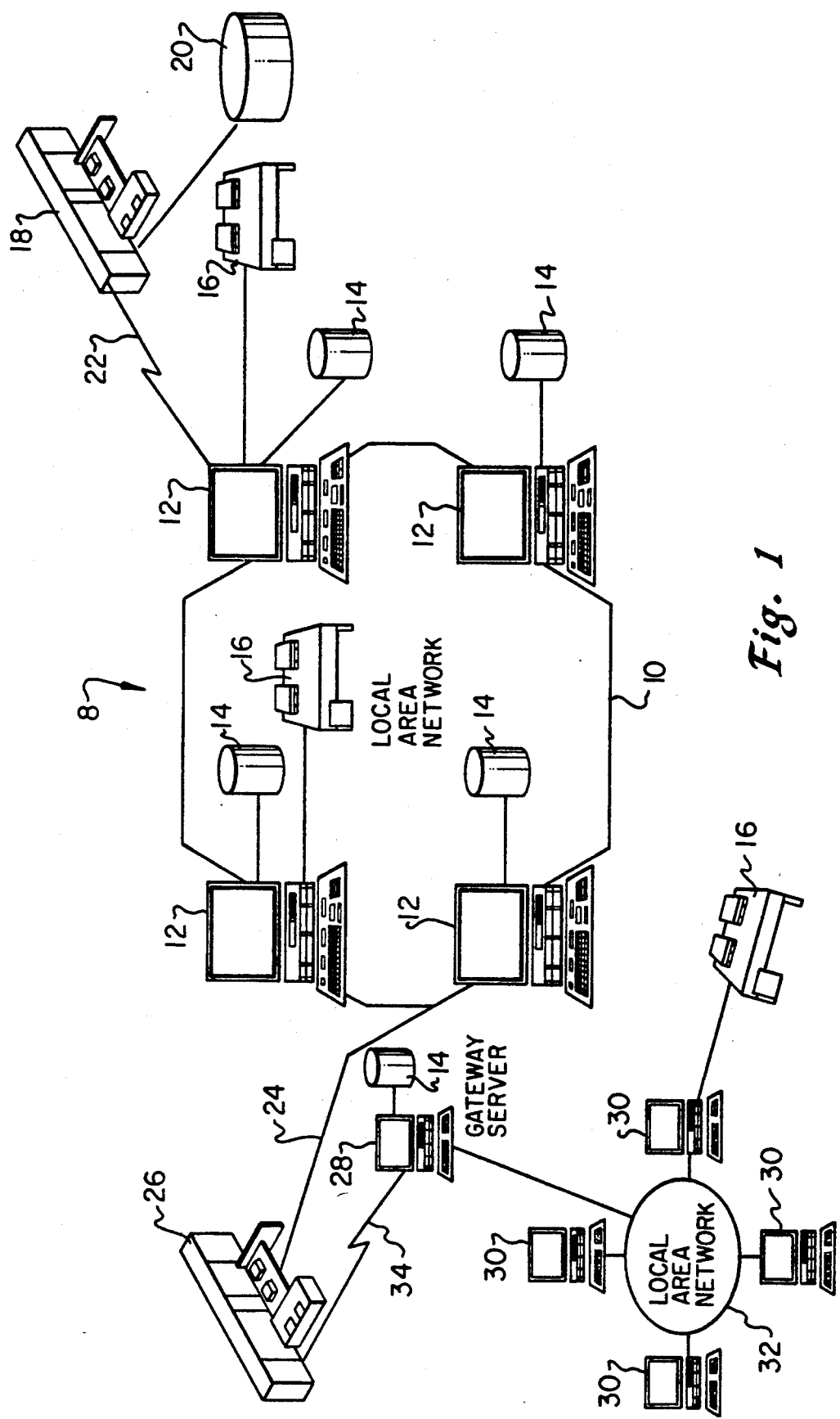
FIG. 1 is a pictorial representation of a distributed data processing system which may be utilized to implement the method of the present invention.

With reference now to the figures and in particular with reference to FIG. 1, there is depicted a pictorial representation of a data processing system s which may be utilized to implement the method of the present invention. As may be seen, data processing system s may include a plurality of networks, such as Local Area Networks (LAN) 10 and 32, each of which preferably includes a plurality of individual computers 12 and 30, respectively of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device one or more such storage devices 14 may be utilized, in accordance with the method of the present invention, to store the various documents which may be periodically accessed, processed and/or transmitted by a user within data processing system 8, and thereafter utilized to automatically generate a meeting agenda in accordance with the method of the present invention. In a manner well known in the prior art, each such document may be stored within a storage device 14 which is associated with a Resource Manager or Library Service, which is responsible for maintaining and updating all documents associated therewith Still referring to FIG. 1, it may be seen that data processing network s also include multiple central computer systems, such as central computer system 18, which may be preferably coupled to Local Area Network (LAN) 10 by means of communications link 22. In the preferred embodiment, central computer system 18 is an IBM System/370, although other computer systems, such as an IBM Application System/400 or PS/2 could also be used. In addition, central computer system 18 is not necessary if one or more local area networks are sufficient to connect all desired users. Central computer system 18 may also be coupled to a storage device 20 which may also serve as remote storage for Local Area Network (LAN) 10. Similarly, Local Area Network (LAN) lo may be coupled via communications link 24 through a subsystem control unit/communications controller 26 and communications link 34 to gateway server 28. Gateway server 28 is preferably an individual computer or Interactive Work Station (IWS) which serves to link Local Area Network (LAN) 32 to Local Area Network 10 such that electronic mail messages may be easily transmitted and received between individuals within either network.

As discussed above with respect to Local Area Network (LAN) 32 and Local Area Network (LAN) 10, a plurality of documents may be stored within storage device 20 and controlled by central computer system 18, as Resource Manager or Library Service for the documents thus stored. Of course, those skilled in the art that central computer system 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network 8 to be able to create or select a document for transfer to other users within data processing network 8. This is generally accomplished utilizing any suitable software application which permits documents, notes or other collections of data to be transmitted or received throughout data processing network 8. Examples of such applications are PROFS, OfficeVision, or CMS note facility used by IBM computers. In the case of invention disclosure documents or other similar documents, the method and apparatus of the present invention will permit an electronic corroboration of such documents to be obtained at a subsequent time.

Figure 2:
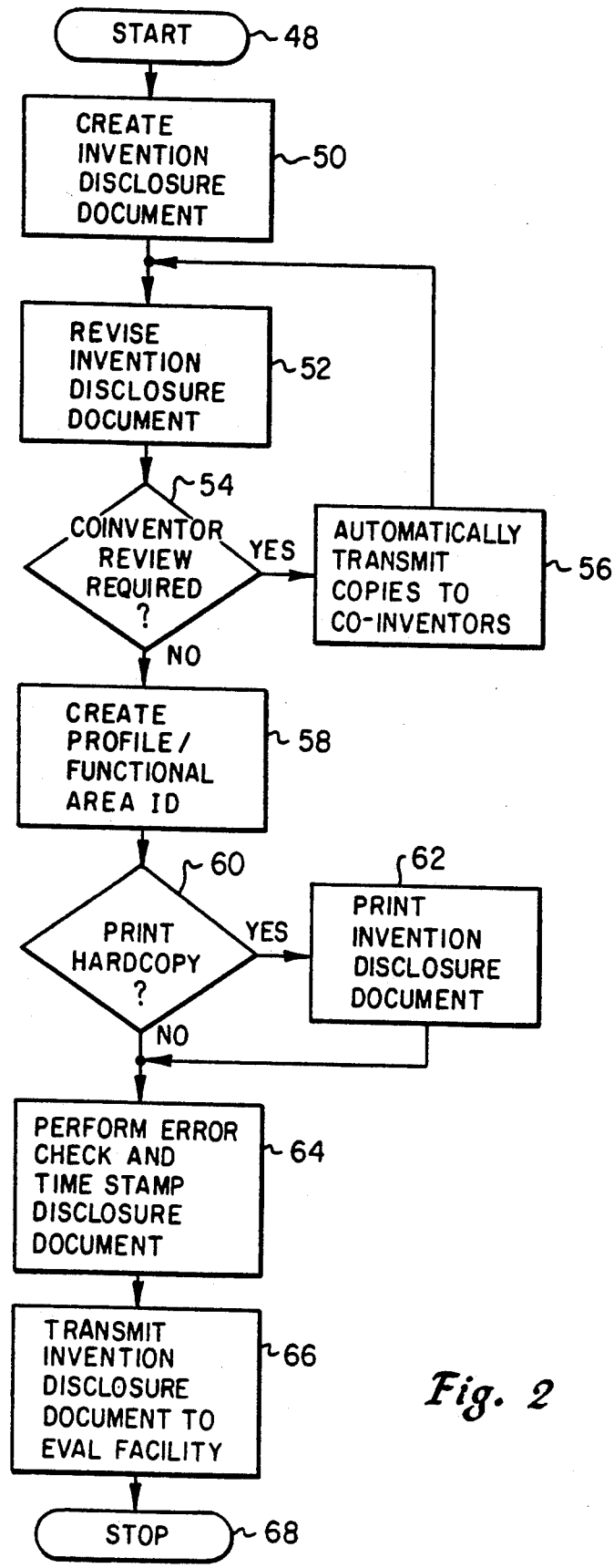
FIG. 2 is a high level flow chart depicting the creation of an electronic invention disclosure document which may be automatically distributed and evaluated in accordance with the method and apparatus of the present invention.

Referring now to FIG. 2, there is depicted a high level flow chart which illustrates the creation of an electronic invention disclosure document which may be automatically distributed in accordance with the method and apparatus of the present invention. As is illustrated, the process begins at block 48 and thereafter passes to block 50 which depicts the creation of an invention disclosure document. In the preferred embodiment, the user is prompted for personal information about each inventor, critical dates information about statutory bar dates, and information about the problem solved and the solution. Next, block 52 gives the user the opportunity to revise the invention disclosure document, if such revision is necessary. Block 54 depicts a determination of whether or not co-inventor review is required and if so, the process passes to block 56 which illustrates the automatic transmission of copies of the invention disclosure document to each listed co-inventor. Next, the process returns to block 52 to illustrate the review and revision of the invention disclosure document based upon input from one or more co-inventors.

If, as a result of the determination illustrated in block 54, no additional co-inventor review is required, or all co-inventors have reviewed the invention disclosure document, then the process passes to block 58 which depicts the creation of a document profile/functional area identification. Those skilled in the art will appreciate that the creation of this profile may be accomplished coincident with the creation of the invention disclosure by providing a form document which includes one or more data entry blanks which permit the creator of the document to identify the document by subject matter, author and functional area. Alternatively, as discussed herein, the creator of an invention disclosure document may be presented with a menu screen which lists multiple functional areas from which the document creator may select an appropriate listing. Similarly, a functional area identification may be automatically assigned in response to an examination of personal information inputted for each inventor, such as department number, division, building, et cetera, by correlating the employee's division or department with a functional area identification.

Next, block 60 illustrates a determination of whether or not it is desired to create a hard copy of the invention disclosure document. If so, the process passes to block 62 which depicts the printing of a hard copy of the invention disclosure document. At this point, block 64 depicts the determination of whether or not the invention disclosure document is now in final form and ready to be submitted to an evaluation facility by the performance of an automated error check to determine if all required data for a complete invention disclosure document has been entered. A date/time stamp is also automatically assigned to each invention disclosure document to assist in the management and corroboration of such documents. Thereafter, block 66 illustrates the transmission of the invention disclosure document to an evaluation facility and the process terminates, as depicted in block 68.

While the method and apparatus of the present invention will find application in the automated distribution of any electronic document, the illustrated example discloses the distribution of invention disclosure documents. Accordingly, the revised invention disclosure document and its associated profile/functional area identification information will thereafter be transmitted to an intellectual property law facility for further processing.

In alternate embodiments of the present invention wherein the electronic document to be distributed is a suggestion, the preceding description is also applicable; however, the term "inventor" should be replaced by "suggestor." Further processing of a suggestion will be done by a suggestion evaluation facility, rather than an intellectual property law facility as described herein.

Referring again to FIG. 1, it should be apparent to those skilled in the art that an evaluation facility for such documents may be located at any point within data processing network 8. Often a centralized evaluation facility is utilized for such documents; however, many large corporate entities utilize a decentralized evaluation facility wherein all invention disclosure documents from a particular geographic area are routed to a local evaluation facility.

Figure 3:
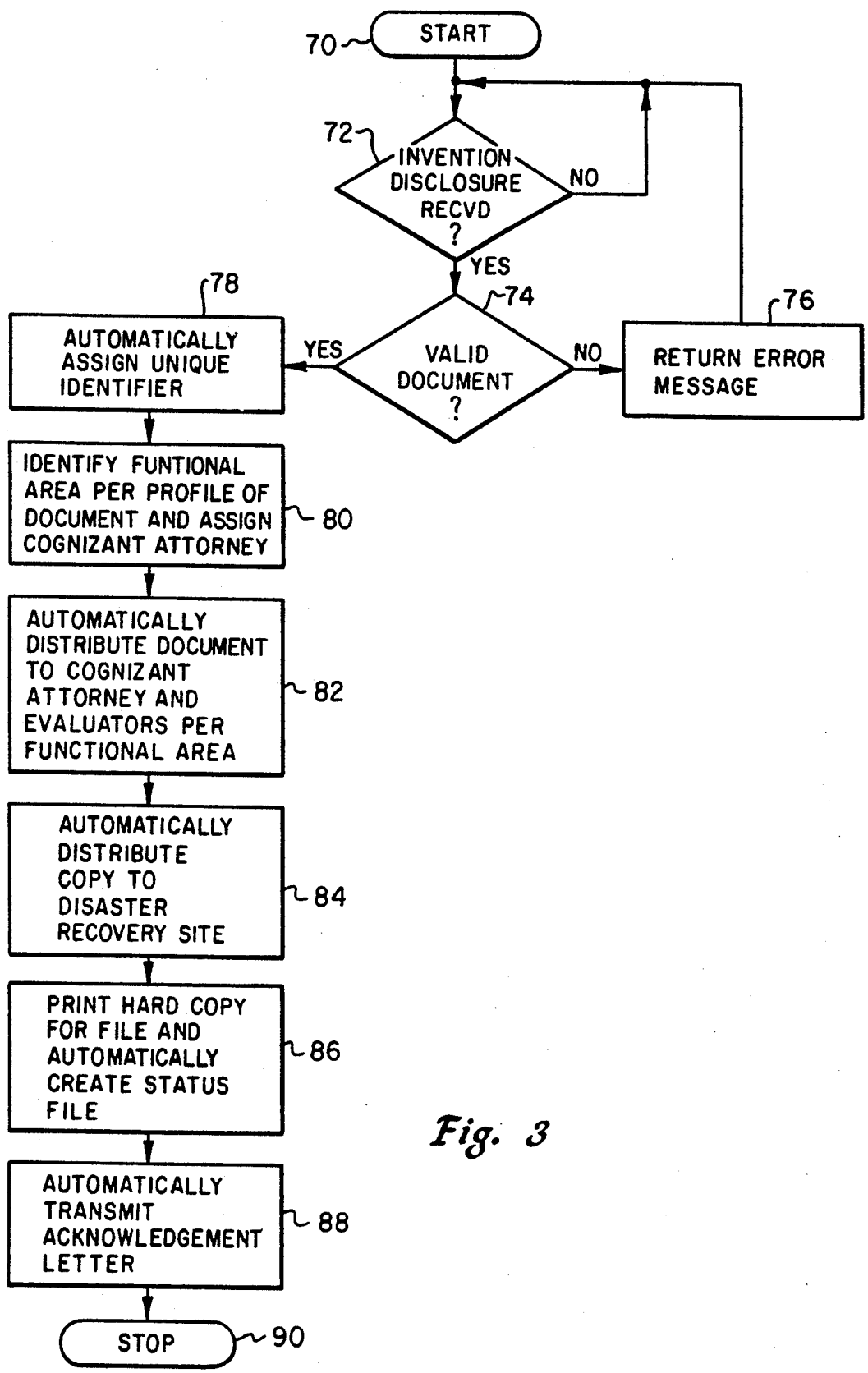
FIG. 3 is a high level flow chart depicting the automatic distribution of an electronic invention disclosure document in accordance with the method and apparatus of the present invention.

With reference now to FIG. 3, there is illustrated a high level flow chart which depicts the automatic distribution of an electronic invention disclosure document for evaluation and corroboration, in accordance with the method and apparatus of the present invention. As is depicted, this process begins at block 70 and thereafter passes to block 72 which illustrates a determination of whether or not an invention disclosure document has been received at the evaluation facility. If not, the process merely iterates until such time as this event occurs. After receiving an invention disclosure document at the evaluation facility, block 74 depicts the determination of whether or not the document received is a valid invention disclosure document. That is, whether or not the invention disclosure document is organized in the desired format and includes all required information. If the document received is not valid, an error message is generated, as illustrated in block 76, and the process returns to block 72 to await the receipt of a subsequent invention disclosure document. Next, block 78 depicts the automatic assigning of a unique identifier, such as a disclosure number, to be associated thereafter with the invention disclosure document. In the preferred embodiment, the disclosure number includes an indication of the year the disclosure was received and a four digit number beginning at "0001" and sequentially incrementing each time a new disclosure is received.

At this point, block 80 illustrates the identification of the functional area for the invention disclosure document from the profile information contained with the document and the automatic assignment of a cognizant attorney. Thereafter, block 82 illustrates the automatic distribution of the invention disclosure document to the cognizant attorney and one or more preselected evaluators, determined in accordance with the functional area information contained within the document profile which was developed as discussed herein. This is accomplished by automatically creating a distribution list of appropriate evaluators, along with corresponding electronic addresses, in response to the aforementioned functional area information. In this manner, an invention disclosure document may be efficiently and automatically distributed to a plurality of evaluators for a determination as to the eventual status of the invention disclosure document.

Block 84 then illustrates the automatic distribution of a copy of the invention disclosure document to a disaster recovery site. In this manner, should a fire, earthquake, flood, or other disaster befall the facility which has been utilized to store an invention disclosure document, a copy of that document may be retrieved from a designated disaster recovery site.

Next, block 86 depicts the printing of a hard copy of the invention disclosure document for use in paper files and the automatic creation of a status file to be associated with the uniquely identified invention disclosure document. This status file may be utilized to provide a method for determining the status of an invention disclosure document at any given time. For example, the status file will typically contain the date upon which an invention disclosure document was distributed for evaluation, the dates each evaluator returned a response and any dates which must be met to preserve patentability.

Thereafter, block 88 illustrates the automatic transmission of an acknowledgement letter. Acknowledgement letters are typically sent to the inventors of each invention disclosure document and their management indicating that the document has been received at the evaluation facility and that the document has been distributed for evaluation. Thereafter, this process terminates, as illustrated in block 90.

Figure 4:
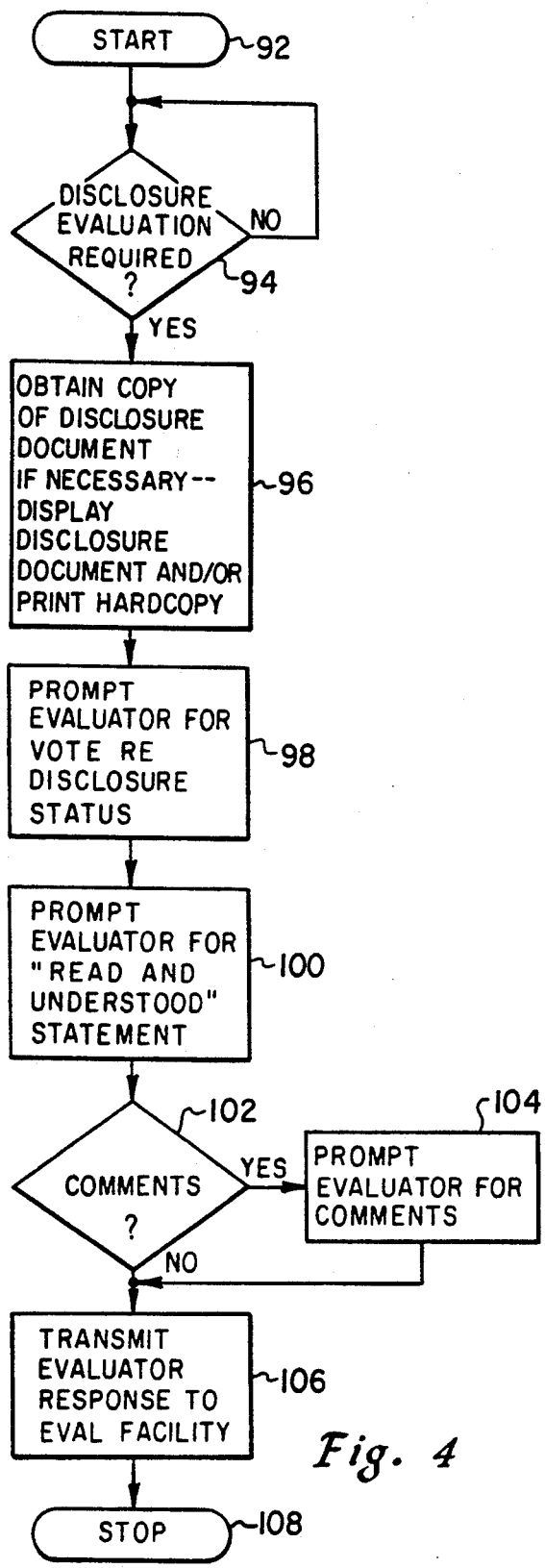
FIG. 4 is a high level flow chart depicting the evaluation of an electronic invention disclosure document in accordance with the method and apparatus of the present invention.

Referring now to FIG. 4, there is depicted a high level flow chart which illustrates the evaluation and corroboration of an electronic invention disclosure document in accordance with the method and apparatus of the present invention. As above, the process illustrated in FIG. 4 begins at block 92 and thereafter passes to block 94. Block 94 depicts a determination of whether or not an invention disclosure document evaluation request has been received by an evaluator. If not, the process merely iterates until such time as a request for an evaluation of an invention disclosure document is received.

After receiving a request for an invention disclosure document evaluation, block 96 illustrates the obtaining of a copy of the invention disclosure document and the displaying of the disclosure document to the evaluator and/or the printing of a hard copy thereof. Those skilled in the art will appreciate that this may be accomplished utilizing any suitable word processing or text display technique, such as Xedit or browse capability of IBM Operating System CMS. After displaying the disclosure document to the evaluator, block 98 illustrates the prompting of the evaluator for a vote with regard to the proposed status of the invention disclosure document. In the depicted embodiment of the present invention an evaluator may vote to initiate a search of the technology disclosed within the invention disclosure document to investigate possible patentability. The evaluator may also vote to publish the document, close the file, abstain from a vote with regard to a particular invention disclosure document.

Next, in accordance with an important feature of the present invention, block 100 depicts the prompting of the evaluator for a "Read and Understood" statement. This is accomplished, in the depicted embodiment of the present invention, by presenting a computer screen to the evaluator which asks whether the evaluator has read and understood the entire invention disclosure. This prompt requires the evaluator to enter an indication of "yes" or "no" in response to this statement.

Additionally, block 102 illustrates a determination of whether or not the evaluator wishes to enter a comment with regard to an invention disclosure document, in addition to a simple vote and/or corroboration. If so, block 104 depicts the prompting of the evaluator to enter his comments. These comments may be utilized by the Chairman of an Evaluation Committee for a determination of how strongly the evaluator feels with regard to his or her vote, or as part of an agenda to be distributed prior to a scheduled meeting to discuss one or more invention disclosure documents.

Thereafter, block 106 illustrates the transmission of the evaluator's response and comments to the evaluation facility for utilization by the Chairman of the Evaluation Committee. At this point, the process terminates, as illustrated in block 108.

With reference now to FIG. 5, there is depicted a pictorial representation of a computer screen which may be utilized to prompt a computer user to evaluate an electronic invention disclosure document in accordance with the method and apparatus of the present invention. As is illustrated, computer screen 110 depicts an INVENTION DISCLOSURE EVALUATION REPORT screen which may be generated for utilization with the method and apparatus of the present invention. At line 112 therein a disclosure number, that is, the unique identification assigned to this disclosure at the evaluation facility, may be entered along with the date and time. Of course, this information may be automatically entered by the system, if so desired.

Line 114 of computer screen 110 illustrates the evaluation vote of the evaluator and requires the evaluator to enter an indication of his or her vote with regard to a particular disclosure. As illustrated, the evaluator may vote to initiate a search to determine possible patentability of the invention disclosure, may indicate that the invention disclosure should be published or closed, may indicate that he or she does not know what status should be assigned the invention disclosure, or may abstain from the vote.

Next, line 116 of computer screen 110 depicts an important statement to be utilized with regard to the automatic corroboration of an invention disclosure document in accordance with the method and apparatus of the present invention. Line 116 requires the evaluator to indicate that he or she has "Read and Understood" the entire invention disclosure, by entering an "X" in the appropriate space. Next, line 118 of computer screen 110 permits the evaluator to make an entry indicating whether or not he or she believes that further discussion is necessary with regard to this invention disclosure.

Line 120 of computer screen 110 permits the evaluator to enter an indication of his or her level of expertise with regard to the technical or functional area of the invention disclosure under consideration. Of course, those skilled in the art will appreciate that it is a simple matter to utilize this indication of expertise as a weighting factor in a voting process involving one or more evaluators with regard to a particular invention disclosure evaluation.

Finally, line 122 of computer screen 110 permits the evaluator to enter narrative comments with regard to a particular invention disclosure. These comments may be utilized by the Chairman of the Evaluation Committee to determine the strength of the evaluator's opinion or for utilization in preparing an agenda for a subsequent meeting, in the event the disposition of a particular disclosure is not clearly determined by the automatic evaluation process.

Figure 6:
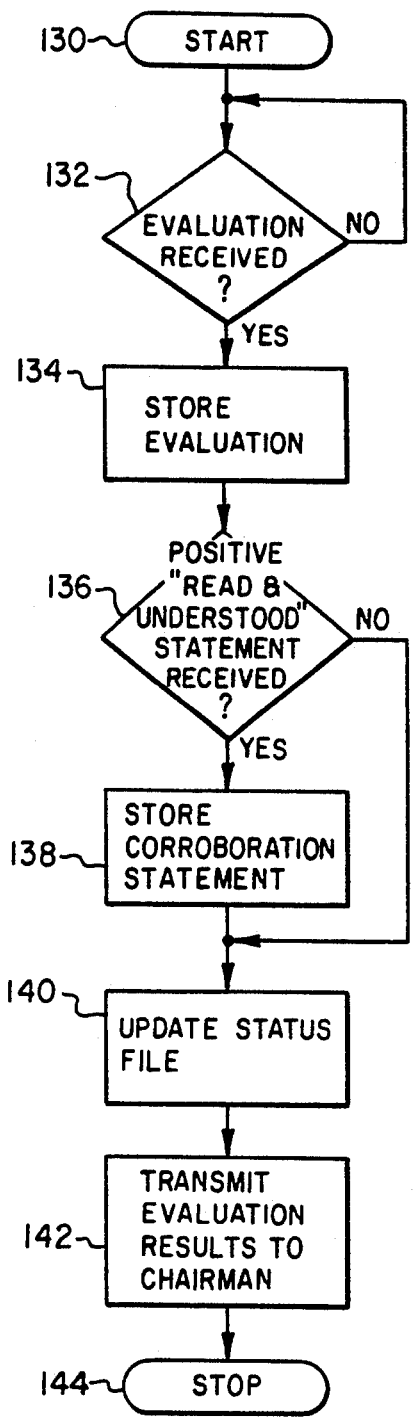
FIG. 6 is a high level flow chart depicting the storing of an evaluation of an electronic invention disclosure document in accordance with the method and apparatus of the present invention.

Referring to FIG. 6, there is depicted a high level flow chart which illustrates the storing of an evaluation and corroboration of an electronic invention disclosure document in accordance with the method and apparatus of the present invention. As above, this process begins at block 130 and thereafter passes to block 132 which illustrates a determination of whether or not an evaluation of a particular invention disclosure document has been received. If not, the process merely iterates until such time as an evaluation is received.

After receiving an evaluation for an invention disclosure document, block 134 depicts the storing of that evaluation. The evaluation of a particular invention disclosure document may be stored at the evaluation facility, at the terminal of the Chairman of the Evaluation Committee, and/or at the disaster recovery site which has been utilized to store the backup copy of the invention disclosure document in question.

Next, block 136 illustrates a determination of whether or not a positive "Read and Understood" statement has been received in response to the prompting of the evaluator, which was depicted in block 98 of FIG. 4. In the event a positive "Read and Understood" statement is not received, the process directly passes to block 140. However, in the event a positive "Read and Understood" statement has been received from the evaluator in response to the prompting referred to above, block 138 illustrates the storing of this corroboration of the invention disclosure document. As above, this corroboration statement may be stored with the invention disclosure document at the evaluation facility, at the terminal of the Chairman of the Evaluation Committee, and/or at the disaster recovery site referred to above.

Next, after storing a positive corroboration statement which has been received, or in the event no positive corroboration statement has been received, block 140 illustrates the updating of the status file which was created as illustrated in block 82 of FIG. 3. As discussed above, this status file contains information regarding the status of a particular invention disclosure document and should thus be updated when an evaluation of the invention disclosure document has been received.

Finally, block 142 illustrates the transmitting of the evaluation results to the Chairman of the Evaluation Committee. This process permits the Chairman of an Evaluation Committee to make a final determination with regard to the status of a particular invention disclosure document, if the voting process has resulted in a clear cut indication of such status, or to schedule a meeting for discussion of a particular invention disclosure document, if the electronic voting process indicates a dichotomy among the members of the Evaluation Committee. Thereafter, as illustrated in block 144, the process terminates.

Figure 7:
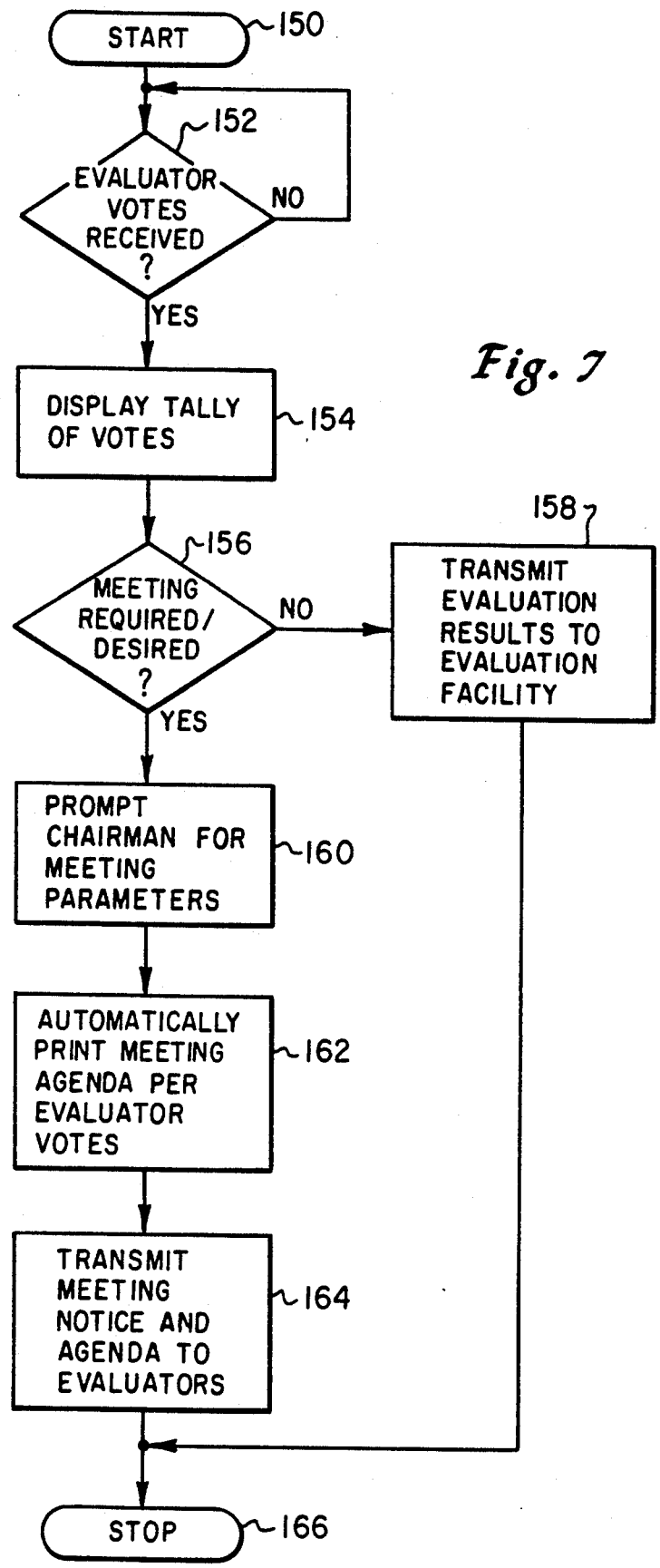
FIG. 7 is a high level flow chart depicting the generation of an automatic meeting agenda utilizing stored evaluations of an invention disclosure document in accordance with the method and apparatus of the present invention.

With reference now to FIG. 7, there is depicted a high level flow chart which illustrates the generation of an automatic meeting agenda utilizing stored evaluations of an invention disclosure document in accordance with the method and apparatus of the present invention. As above, the process illustrated in FIG. 7 begins at block 150 and thereafter passes to block 152. Block 152 depicts a determination of whether or not evaluator votes have been received with regard to a particular invention disclosure document. If not, the process merely iterates until such time as evaluator votes have been received. Of 5 course, those skilled in the art will appreciate that a prompting message may be utilized to induce an evaluator to submit a vote for a particular invention disclosure document in the event the evaluator has not done so within a preselected period of time.

After one or more evaluator votes for an invention disclosure document have been received, as determined in block 152, then block 154 illustrates the displaying of the tally of the votes for the Chairman of the Evaluation Committee. This tally may take the form of any suitable visual summary so that the Chairman may determine whether or not the Evaluation Committee has rendered a result which effectively disposes of a particular invention disclosure document, or whether, in the alternative, further action, such as a meeting, is required.

Thereafter, block 156 illustrates a determination of whether or not a meeting of the evaluators is required or desired in order to ascertain the proper status for a particular invention disclosure document. If no meeting is required or desired, the process passes to block 158 which depicts the transmission of the evaluation results to the evaluation facility. These evaluation results may then be utilized by the evaluation facility to indicate whether or not the invention disclosure document in question should be authorized to form the basis for a patentability search to determine if a patent application should be filed, should be published, or should be closed. Of course, as utilized herein the term "evaluation facility" may be utilized to describe the Chairman of the Evaluation Committee, a functional manager, an intellectual property law facility or any other entity empowered within an organization to make such decisions. Thereafter, the process terminates, as indicated at block 166.

Referring again to block 156, if a meeting of the evaluators is required or desired by the Chairman of the Evaluation Committee, block 160 illustrates the prompting of the Chairman to enter a plurality of meeting parameters. Those skilled in the art of automated calendar systems will appreciate that by the term "meeting parameters" what is meant is a desired duration time for a meeting, a desired date span within which the meeting must be held, and a list of desired attendees for the meeting. In the case of an invention disclosure document evaluation, the desired attendees for the meeting will most probably include those evaluators who have previously evaluated the invention disclosure document.

Next, in accordance with an important feature of the present invention, block 162 illustrates the automatic printing of a meeting agenda by the utilization of the evaluator votes and comments which have been received by the Chairman of the Evaluation Committee and stored within distributed data processing system 8 (see FIG. 1). An example of an automatically created meeting agenda will be illustrated in greater detail in FIG. 8. Next, block 164 depicts the transmitting of a meeting notice and a copy of the automatically generated agenda to the evaluators who are the desired attendees for the meeting scheduled by the Chairman of the Evaluation Committee. Thereafter, the process terminates as illustrated in block 166.

Finally, referring now to FIG. 8 there is depicted a pictorial representation of a computer screen displaying an automatically generated meeting agenda which is generated in accordance with the method and apparatus of the present invention. As is illustrated, computer screen 170 depicts the first page of an automatically generated meeting agenda which may be created in accordance with the method and apparatus of the present invention. Line 172 within computer screen 170 illustrates entry points which may be utilized to enter a uniquely assigned disclosure number, and the date and time associated therewith. In a preferred embodiment of the present invention this may be accomplished automatically by the data processing system to ensure accuracy. Next, line 174 illustrates a tabulation summary, which, as listed below at line 176, includes a listing Of each evaluator who has rendered an opinion with regard to an identified disclosure and the opinion of that evaluator with regard to the status of that disclosure.

Further, section 176 of Computer display screen 170 also includes an indication of whether or not each evaluator believes further discussion is necessary and whether or not that evaluator has read and understood the disclosure. For example, evaluator "Smith" believes that the disclosure number in question merits a search to determine possible patentability of the invention disclosed therein. Further, evaluator "Smith" believes that additional discussion is necessary and indicates that he has read and understood the invention disclosure. In contrast, evaluator "Thompson" indicates that he does not know what the status of the disclosure number in question should be, that he believes further discussion is necessary and that he has not understood the selected invention disclosure document.

Next, in accordance with an important feature of the present invention, the meeting agenda created automatically in accordance with the method and apparatus of the present invention includes a plurality of sections 178, 180 and 182 which each display the name of a particular evaluator and the vote status of that evaluator with regard to the invention disclosure document in question. Further, each section includes the date and time upon which the evaluator entered his vote, an indication of the knowledge level of the evaluator and a reproduction of any comments which were entered by the evaluator during his or her evaluation of the invention disclosure document, utilizing an evaluation screen such as the one depicted in FIG. 5.

In this manner, the decision of the Chairman of the Evaluation Committee to schedule a meeting with regard to a particular invention disclosure document may be utilized as the catalyst for the automatic creation of a meeting agenda which includes a summary of the evaluation of each evaluator assigned for the invention disclosure document in question, as well as a listing of any comment entered by each evaluator with regard to the invention disclosure document. Of course, a weighted vote calculation may also be determined utilizing the knowledge factor of each evaluator as an assigned weight.

In this manner, each desired attendee at a meeting to further evaluate a particular invention disclosure document may review the comments of those other attendees scheduled to participate in the meeting. Of course, those skilled in the art will appreciate that it is likely that multiple invention disclosure documents will be considered at a single meeting and that several pages of meeting agenda, such as the page depicted in FIG. 8, will be automatically generated and distributed prior to each meeting for utilization by the meeting attendees.

Upon reference to the foregoing those skilled in the art will appreciate that the Applicants have provided a method and apparatus whereby a plurality of invention disclosure documents may be automatically distributed to a preselected group of evaluators for evaluation and wherein a meeting agenda may be automatically created in response to the scheduling of a meeting for further evaluation, utilizing the evaluator comments and votes which have been stored within the data processing system.

While the invention has been particularly shown and described with reference to a preferred embodiment, it will be understood by those skilled in the art that various changes in form and detail may be made therein without departing from the spirit and scope of the invention.

We claim:

1. A method in a data processing system having a plurality of users enrolled therein for automatically generating a meeting agenda for a requested meeting concerning a document stored within said data processing system, said document having a document profile associated therewith, said document profile including at least an identification of a technical area relating to said document, said method comprising the steps of:
   identifying a document stored within said data processing system;
   soliciting an evaluation of said document from a selected group of said plurality of users enrolled within said data processing system, said selected group of said plurality of users determined in response to said identification of said technical area within said document profile;
   soliciting an indication of each user's knowledge level regarding said document; and
   automatically creating a meeting agenda incorporating said evaluation of said document from each of said selected group of said plurality of users in response to a user for a meeting concerning said document.

2. The method in a data processing system having a plurality of users enrolled therein for automatically generating a meeting agenda for a requested meeting concerning a document stored within said data processing system according to claim 1, further including the step of displaying a summary of said evaluations of said document from said selected group of said plurality of users.

3. The method in a data processing system having a plurality of users enrolled therein for automatically generating a meeting agenda for a requested meeting concerning a document stored within said data processing system according to claim 1, further including the step of prompting a user to enter desired meeting parameters in response to a request for a meeting concerning said document.

4. The method in a data processing system having a plurality of users enrolled therein for automatically generating a meeting agenda for a requested meeting concerning a document stored within said data processing system according to claim 3, wherein said step of prompting a user to enter desired meeting parameters in response to a request for a meeting concerning said document includes the step of prompting said user to indicate a list of desired attendees for said meeting.

5. The method in a data processing system having a plurality of users enrolled therein for automatically generating a meeting agenda for a requested meeting concerning a document stored within said data processing system according to claim 4, further including the step of automatically transmitting a notice of said meeting to each desired attendee.

6. The method in a data processing system having a plurality of users enrolled therein for automatically generating a meeting agenda for a requested meeting concerning a document stored within said data processing system according to claim 5, further including the step of automatically transmitting said meeting agenda to each desired attendee.

7. The method in a data processing system having a plurality of users enrolled therein for automatically generating a meeting agenda for a requested meeting concerning a document stored within said data processing system according to claim 1, wherein said step of automatically creating a meeting agenda incorporating said evaluation of said document from each of said selected group of said plurality of users in response to a user request for a meeting concerning said document includes the step of printing said meeting agenda.

8. A system for automatically generating a meeting agenda for a requested meeting concerning a document stored within a data processing system having a plurality of users enrolled therein, said document having a document profile associated therewith, said document profile including at least an identification of a technical area relating to said document, said system comprising:
   means for identifying selected document stored within said data processing system;
   means for distributing said selecting document to a selected group of said plurality of users enrolled in said data processing system, said selected group of said plurality of users determined in response to said identification of said technical area within said document profile;
   data entry means for permitting entry of an evaluation of said selected document and an indication of knowledge level regarding said document by said selected group of users enrolled in said data processing system; and
   means for automatically creating a meeting agenda incorporating said evaluation of said selected document from each of said selected group of users in response to a user request for a meeting concerning said selected document.

9. The system for automatically generating a meeting agenda for a requested meeting concerning a document stored within a data processing system having a plurality of users enrolled therein according to claim 8, further including means for displaying a summary of said evaluations of said selected document by said selected group of users.

10. The system for automatically generating a meeting agenda for a requested meeting concerning a document stored within a data processing system having a plurality of users enrolled therein according to claim 8, further including means for printing said meeting agenda.

11. The system for automatically generating a meeting agenda for a requested meeting concerning a document stored within a data processing system having a plurality of users enrolled therein according to claim 8, further including means for transmitting said meeting agenda to a second selected group of users enrolled in said data processing system.

* * * * *